United States Patent
Wang et al.

(10) Patent No.: US 9,145,309 B2
(45) Date of Patent: Sep. 29, 2015

(54) PHASE SEPARATION TANK

(71) Applicant: Kennecott Utah Copper LLC, South Jordan, UT (US)

(72) Inventors: Shijie Wang, Riverton, UT (US); Daniel Kim, Cottonwood Heights, UT (US); Kenneth Lee Moretensen, Sandy, UT (US)

(73) Assignee: Kennecott Utah Copper LLC, South Jordan, UT (US)

( * ) Notice: Subject to any disclaimer, the term of this patent is extended or adjusted under 35 U.S.C. 154(b) by 258 days.

(21) Appl. No.: 13/967,754

(22) Filed: Aug. 15, 2013

(65) Prior Publication Data

US 2014/0110334 A1     Apr. 24, 2014

Related U.S. Application Data

(60) Provisional application No. 61/715,968, filed on Oct. 19, 2012.

(51) Int. Cl.
| | | |
|---|---|---|
| *C02F 1/40* | (2006.01) | |
| *B01D 17/032* | (2006.01) | |
| *B01D 11/04* | (2006.01) | |
| *B01D 17/02* | (2006.01) | |

(52) U.S. Cl.
CPC . *C02F 1/40* (2013.01); *B01D 11/04* (2013.01); *B01D 11/0446* (2013.01); *B01D 17/0211* (2013.01); *B01D 17/0214* (2013.01)

(58) Field of Classification Search
CPC .... B01D 17/0211; B01D 17/0214; C02F 1/40
USPC ........... 210/521, 532.1, 534, 535, 540
See application file for complete search history.

(56) References Cited

U.S. PATENT DOCUMENTS

| | | | | |
|---|---|---|---|---|
| 2,831,579 A | * | 4/1958 | Gehle | 210/540 |
| 3,804,252 A | * | 4/1974 | Rishel | 210/532.1 |
| 3,971,719 A | * | 7/1976 | Peters | 210/540 |
| 4,483,774 A | * | 11/1984 | Brill et al. | 210/540 |
| 4,501,671 A | * | 2/1985 | Bazell | 210/532.1 |
| 4,869,831 A | | 9/1989 | Hinkle, II | |
| 4,980,070 A | * | 12/1990 | Lieberman | 210/522 |
| 5,378,376 A | * | 1/1995 | Zenner | 210/540 |
| 5,511,881 A | | 4/1996 | Post et al. | |

(Continued)

FOREIGN PATENT DOCUMENTS

DE      256972      11/1911

*Primary Examiner* — Christopher Upton
(74) *Attorney, Agent, or Firm* — Whyte Hirschboeck Dudek S.C.

(57) ABSTRACT

A phase separation tank for separating an aqueous liquid from an organic liquid, the tank comprising:
(A) A separation compartment having a sloped bottom wall and an aqueous liquid outlet;
(B) An organic liquid compartment separated from the separation compartment by an organic separator of a height that allows for the overflow of organic liquid from the separation compartment to the organic compartment;
(C) An aqueous liquid compartment separated from the organic liquid compartment by an aqueous separator and separated from the separation compartment by the organic compartment, the aqueous liquid compartment equipped with an aqueous liquid inlet; and
(D) Means for transferring aqueous liquid from the aqueous liquid outlet of the separation compartment to the aqueous liquid inlet of the aqueous compartment.

2 Claims, 5 Drawing Sheets

(56) References Cited

U.S. PATENT DOCUMENTS

| | | |
|---|---|---|
| 5,662,861 A | 9/1997 | Taylor |
| 5,942,024 A | 8/1999 | Yoshifumi et al. |
| 5,993,646 A * | 11/1999 | Powers .................. 210/521 |
| 6,099,743 A | 8/2000 | Pedersen |
| 6,132,615 A | 10/2000 | Nyman et al. |
| 7,390,420 B2 | 6/2008 | Nyman et al. |
| 7,753,215 B2 * | 7/2010 | Gigas et al. ............. 210/532.1 |
| 2014/0109725 A1 * | 4/2014 | Wang et al. ................. 75/711 |

* cited by examiner

PHASE SEPARATION TANK

FIELD OF THE INVENTION

This invention relates to a process for the recovery of gold from anode slimes. In one aspect the invention relates to a continuous, completely hydrometallurgical process while in another aspect, the invention relates to a process employing improved mixing tank and phase separation tank designs.

BACKGROUND OF THE INVENTION

In the production of copper, copper-bearing ore is mined, concentrated, smelted and refined. The copper-bearing ore contains many other elements, including many other metals, that must be separated from the copper before the copper is ready for sale. Each step of the copper producing process involves separating these other elements from the copper until the copper reaches a desired sale purity, typically four "nines" purity, i.e., 99.99% copper.

The smelting stage of the copper producing process produces a copper anode which is typically three hundred plus pounds and 98+ percent copper. These anodes contain, among other elements, various metals some of which are quite valuable. In order to separate these other elements from the copper, these anodes are placed into a tank (or "electrolytic cell") of electrolyte containing sulfuric acid and subjected to a direct current (DC). Under the influence of the electrolyte and electric current, the copper anode dissolves and the copper plates onto a stainless steel cathode to form a copper cathode of four nines purity. The other elements in the copper anode precipitate to the bottom of the tank and form "anode slimes".

Among the components of the anode slimes are such valuable metals as gold and silver and over the years, much effort has been directed to their recovery. These efforts have included both pyrometallurgical and hydrometallurgical methods each of which has its own advantages and disadvantages.

One hydrometallurgical process of interest is that developed by Kennecott Utah Copper and first described by J. E. Hoffmann et al. at the 1995 International Conference of The Metallurgical Society of CIM, *Hydrometallurgical Processing of Kennecott Refinery Slimes*, COPPER 95-COBRE 95 (Vol. III). In this process a slurry of the slimes and water (or an aqueous solution of hydrochloric acid) is formed, and the slurry is vigorously agitated with chlorine or hydrogen peroxide (a procedure known as "wet chlorination"). The chlorinated (or liberated) gold is extracted from the resulting mixture in a multi-stage, countercurrent flow scheme in which dibutyl carbitol (DBC) is the extracting organic solvent. The gold-loaded DBC is then scrubbed with an aqueous acid wash to remove minor metal impurities, the gold reduced directly from the DBC, and recovered.

Variations on this theme have been developed over the years, e.g., U.S. Pat. No. 5,942,024, but the search for improvements continues. For example, a reduction in the footprint of the physical plant in which the process is conducted is desirable both from a capital and operating cost perspective and from the amount of gold held in 'inventory". The larger the physical plant, the costlier to build, operate and maintain the plant, and the more gold is held within the plant.

Another source for improvement is in the recovery of gold from the slimes. In the current process, some gold-loaded DBC is entrained in the aqueous phase of the extraction process, and this can result in a loss of 5 to 20 ppm gold in the raffinate. Any recovery of this "lost" gold can result in a marked improvement to the overall economics of the process.

SUMMARY OF THE INVENTION

In one embodiment the invention is an apparatus for the recovery of gold from a gold-bearing filtrate, the apparatus comprising:
(A) A two-stage solvent extraction (S.E.) circuit comprising:
  (1) A first S.E. mixing assembly;
  (2) A first S.E. phase separation tank in fluid communication with the first S.E. mixing assembly;
  (3) A second S.E. mixing assembly in fluid communication with the first S.E. phase separation tank; and
  (4) A second S.E. phase separation tank in fluid communication with the S.E. second mixing assembly; and
(B) A four-stage acid scrub (A.S.) circuit comprising:
  (1) A first A.S. mixing assembly;
  (2) A first A.S. phase separation tank in fluid communication with the first A.S. mixing assembly;
  (3) A second A.S. mixing assembly in fluid communication with the first A.S. phase separation tank;
  (4) A second A.S. phase separation tank in fluid communication with the A.S. second mixing assembly;
  (5) A third A.S. mixing assembly in fluid communication with the second A.S. phase separation tank;
  (6) A third A.S. phase separation tank in fluid communication with the second A.S. mixing assembly;
  (7) A fourth A.S. mixing assembly in fluid communication with the third A.S. phase separation tank; and
  (8) A fourth A.S. phase separation tank in fluid communication with the fourth A.S. mixing assembly;
with the proviso that the second S.E. phase separation tank is in fluid communication with the first A.S. mixing assembly.

In one embodiment the invention is a process for the recovery of gold from an aqueous gold-bearing (Au-bearing) filtrate obtained from the wet chlorination of decopperized anode slimes, the process comprising the steps of:
(A) Contacting the aqueous Au-bearing filtrate with dibutyl carbitol (DBC) in a two-stage solvent extraction circuit to remove the gold from the aqueous Au-bearing filtrate into the DBC to form a gold-loaded DBC, the contacting performed in a manner such that the aqueous Au-bearing filtrate is contacted in the first stage of the solvent extraction circuit with DBC from the second stage of the solvent extraction circuit and fresh DBC is contacted in the second stage of the solvent extraction circuit with the aqueous Au-bearing filtrate from the first stage of the solvent extraction circuit; and
(B) Contacting the gold-loaded DBC from the second stage of the solvent extraction circuit with an aqueous acid scrub of greater than zero (>0) to 5 N hydrochloric acid in a four-stage acid scrub circuit to remove impurities from the gold-loaded DBC into the aqueous acid scrub to form an impurity-loaded aqueous scrub solution and an impurity-depleted DBC; the contacting conducted in a manner such that the gold-loaded DBC from the second stage of the solvent extraction circuit is contacted in the first stage of the aqueous acid scrub circuit with aqueous acid scrub from the third stage of the aqueous acid scrub circuit, and the gold-loaded DBC from the third stage of the aqueous acid scrub is contacted with fresh aqueous acid scrub in the fourth stage of the aqueous acid scrub circuit. In one embodiment the gold-loaded DBC leaving the fourth stage of the aqueous acid scrub circuit is contacted with a reducing agent to form metallic gold.

In one embodiment the invention is a mixing assembly for intimate contacting of an aqueous phase with an organic phase, e.g., an aqueous filtrate comprising chlorinated gold and an organic phase comprising DBC. In one embodiment the mixing assembly comprises:

(A) A vertical tank having a central vertical axis and comprising a side wall, a bottom inlet and an upper outlet;

(B) A mixing device comprising:
  (1) A shaft having a top end and a bottom end;
  (2) A variable frequency drive (VFD) motor attached to or near the top of the shaft in a manner to rotate the shaft when the motor is activated;
  (3) An axial flow impeller disposed on the shaft and beneath the VFD motor;
  (4) A radial flow plate disposed on the shaft and beneath the axial flow impeller; and
  (5) A radial flow impeller disposed on the shaft and beneath the radial flow plate, the radial flow impeller not extending beyond the radial flow plate;
  the mixing device fitted into the tank and along the central vertical axis of the tank such that the radial flow impeller is located closest to the bottom inlet and the axial flow impeller is located closest to the upper outlet;

(C) A baffle system attached to the side wall of the tank; and (D) A liquid feed assembly connected to and in fluid communication with the bottom inlet of the tank, the liquid feed assembly comprising:
  (1) A feed apparatus comprising top and bottom ends and a divider extending from the top end to the bottom end to divide the feed apparatus into first and second chambers, the top end of each chamber in fluid communication with the bottom inlet of the tank but neither chamber in fluid communication with the other chamber;
  (2) A first feed pipe connected to and in fluid communication with the bottom end of the first chamber; and
  (3) A second feed pipe connected to and in fluid communication with the bottom end of the second chamber.

The mixing assembly of this embodiment of the invention is not only useful in mixing the aqueous and organic phases of this invention, but it is also useful in transferring the organic/aqueous mixture from the first extraction stage to the second extraction stage, from the second extraction stage to the first settler stage, from the first settler stage to the second settler stage, and so forth.

In one embodiment the invention is a phase separation tank for separating an aqueous liquid from an organic liquid, the tank comprising a sloped bottom wall. In one embodiment the phase separation tank comprises:

(A) A separation compartment having a sloped bottom wall and an aqueous liquid outlet;

(B) An organic liquid compartment separated from the separation compartment by an organic separator of a height that allows for the overflow of organic liquid from the separation compartment to the organic compartment;

(C) An aqueous liquid compartment separated from the organic liquid compartment by an aqueous separator and separated from the separation compartment by the organic compartment, the aqueous liquid compartment equipped with an aqueous liquid inlet; and (D) Means for transferring aqueous liquid from the aqueous liquid outlet of the separation compartment to the aqueous liquid inlet of the aqueous compartment.

The phase separation tank is useful in both the solvent extraction and aqueous acid scrub circuits of this invention.

Figure 1:
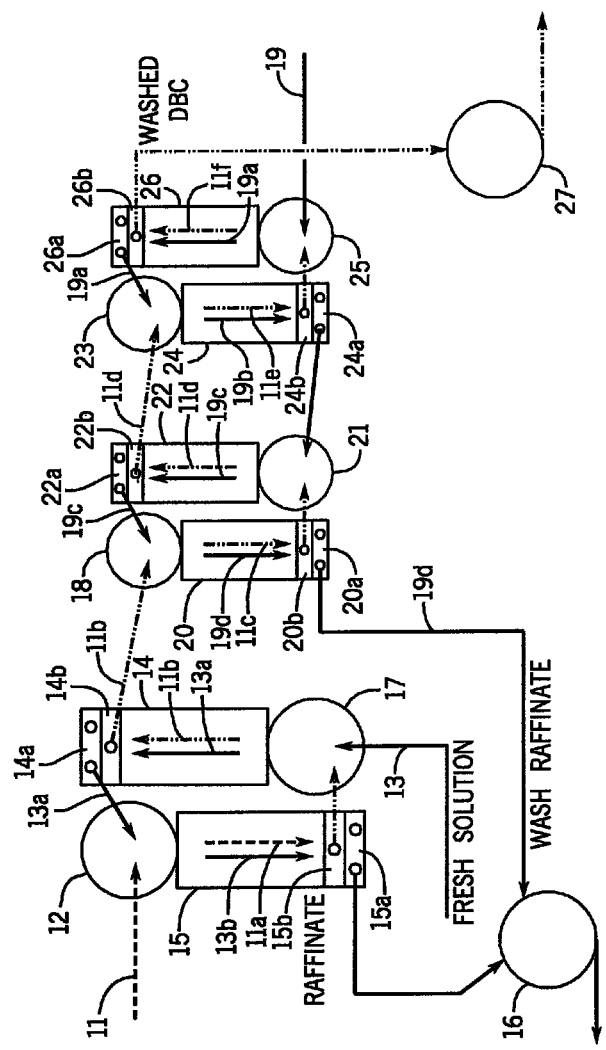
FIG. 1 is a schematic flow diagram of one embodiment of the gold recovery process of this invention.

Like numerals are employed to designate like parts through the drawings and various items of equipment such as valves, fittings, pumps, condensers, holding tanks, feed tanks and the like are omitted so as to simplify the description of the invention. However, those skilled in the art will recognize that such conventional equipment can be employed as desired.

DETAILED DESCRIPTION OF THE PREFERRED EMBODIMENT

Definitions

Unless stated to the contrary, implicit from the context, or customary in the art, all parts and percentages are by weight. For purposes of United States patent practice, the contents of any referenced patent, patent application or publication are incorporated by reference in their entirety (or its equivalent U.S. version is so incorporated by reference) especially with respect to the disclosure of synthetic techniques, definitions (to the extent not inconsistent with any definitions specifically proved in this disclosure, and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, aqueous/organic mixing ratios and component concentrations of various mixtures.

"Comprising", "including", "having" and like terms are not intended to exclude the presence of any additional component, step or procedure, whether or not the same is specifically disclosed. In order to avoid any doubt, all processes claimed through use of the term "comprising" may include one or more additional steps, pieces of equipment or component parts, and/or materials unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

"Fluid communication" and like terms mean that a fluid, i.e., a liquid or gas, can pass from one defined area to another defined area. For example and in the context of this invention, one extraction stage is in fluid communication with another extraction stage, or an extraction stage is in fluid communication with a scrub stage, or one scrub stage is in fluid communication with another scrub stage when the liquid, e.g., solution, emulsion or dispersion, can move from one to another under the influence of either gravity or a pump.

Gold Recovery Process

The general process for the hydrometallurgical treatment of anode slimes is described by J. E. Hoffmann and K. E. Sutliff in their paper entitled *Hydrometallurgical Processing of Kennecott Refinery Slimes*, ibid. Electrolytic refinery slimes, i.e., anode slimes, usually contain between 10% and 40% elemental copper. Since copper can complicate the wet chlorination of the slimes, the slimes are typically first "de-copperized" by any conventional method, e.g., pressure oxidation, such that the final copper content of the slimes is reduced to less than 0.5%. Pressure oxidation can also remove tellurium, if present, which can also complicate wet chlorination.

Upon completion of the pressure oxidation, the slimes are water washed, typically on a washing filter-press, to displace soluble copper from the filter cake. The de-copperized slimes are then slurried in water or in an aqueous solution of hydrochloric acid (HCl) and subjected to vigorous stirring or other agitation. The metal components of the slimes are oxidized, typically with hydrogen peroxide ($H_2O_2$) in combination with a chloride ion, typically provided as HCl. This wet chlorination is exothermic and thus generates heat which is removed. The chlorinated slurry is filtered while hot, cooled and allowed to settle prior to a second or polishing filtration. Solids collected during this polishing filtration are recycled back to the chlorination reaction.

The filtrate from the polishing filtration is then subjected to a two-stage extraction to recover the gold values. The first-stage extraction is conducted in a mixing assembly as first described above and more fully described below. In the first stage, the filtrate, an aqueous solution, is contacted with dibutyl carbitol (DBC), an organic extractant, in a countercurrent manner. DBC, also known as diethylene glycol dibutyl ether, is a stable, low volatility, low toxicity solvent with an excellent selectivity for the gold species, e.g., $2HAuCl_4$, carried within the aqueous filtrate. Extraction kinetics are fast and thus typically require a contact time of three minutes or less. The acidity of the aqueous phase is typically maintained at greater than 0 to 5 normal (N), preferably ≥1.5 to 3 N, HCl, and this represents an acceptable comprise between efficient chlorination and rejection of impurities during solvent extraction.

The first-stage aqueous and organic phases are gravity separated within a phase separation tank as first described above and more fully described below. The phase separation typically takes about 30 minutes. The loaded DBC (e.g., 35-50 grams per liter (g/L)) is advanced to scrubbing and the first-stage raffinate is advance to the second-stage extraction in which it is contacted with the stripped or spent DBC returning from gold reduction. The distribution coefficient of gold between the organic and aqueous phases varies, but two stages of solvent extraction typically ensures a recovery of 99.9% of the aqueous gold content into the organic phase. The final gold content of the second and final raffinate typically does not exceed 1-5 parts per million (ppm). The second-stage extraction also is conducted in a mixing assembly as first described above and which is more fully described below, and the second-stage aqueous and organic phases are gravity separated as are the first-stage aqueous and organic phases, i.e., within a phase separation tank as first described above and more fully described below. Here too, the phase separation takes about 30 minutes.

The Au-loaded DBC phase may contain relatively small amounts of other metals, e.g., selenium, tellurium, antimony, arsenic and bismuth, and these are readily removed by an acid scrub comprising >0 to 5 N, preferably 1 to 4 N and more preferably 1.5 to 3 N, HCl. While this wash can be performed on a batch basis, in the practice of this invention it is continuous, countercurrent four-stage process. The scrubbers are the mixing assemblies first described above and more fully described below, and the aqueous and organic phases are separated with phase separation tanks similar to that used to separate the phases after each stage of the solvent extraction circuit of this process.

After the fourth or last scrub stage, the Au-loaded DBC is contacted with an aqueous solution of a reducing agent, e.g., oxalic acid and/or sodium oxalate. High acidity reduces the rate of reduction and as such, sodium oxalate is a preferred reducing agent. Reduction is performed at an elevated temperature, e.g., 75-80° C.

The reduction of the chlorinated gold species, e.g., $HAuCl_4$, produces a crystalline gold product which is readily filtered and washed free of organic with hot water. Final traces of DBC are removed by an ethanol wash, and a Nutsch box filter is used for solids/liquids separation. The gold-free DBC is returned to the solvent extraction circuit. The reduction liquors which contain sodium chloride, hydrochloric acid and oxalic acid and gold are commingled with the DBC scrub liquors and returned to the solvent extraction circuit.

FIG. 1 illustrates one embodiment of the invention. Anode slimes are de-copperized (not shown) and the de-copperized anode slimes are then subjected to wet chlorination (not shown) to form an aqueous stream (filtrate) 13 comprising chlorinated gold. Organic DBC stream 11 is fed to first-stage solvent extractor 12 in which it is contacted with first Au-depleted aqueous stream (raffinate) 13a which is withdrawn from aqueous phase collection area 14a of second-stage phase separator 14. Organic DBC stream 11 further depletes the gold content of first Au-depleted raffinate 13a thus forming a second Au-depleted raffinate 13b and a first Au-loaded organic DBC stream 11a. Au-depleted raffinate 13b and first Au-loaded organic DBC stream 11a are collected in first-stage phase separation tank 15 in which first Au-loaded organic DBC stream 11a and second Au-depleted raffinate 13b are separated by gravity. Second Au-depleted raffinate 13b is heavier or denser than first Au-loaded organic DBC stream 11a and as such, second Au-depleted raffinate 13b collects at the bottom of phase separation tank 15 in aqueous phase collection area 15b. Since first Au-loaded organic DBC stream 11a is lighter or less dense than second Au-depleted raffinate 13b, first Au-loaded organic DBC stream 11a collects in organic DBC collection area 15a which is on top of and in contact with second Au-depleted raffinate 13b.

Second Au-depleted raffinate 13b is removed from organic DBC collection area 15a to aqueous collection tank 16. First Au-loaded organic DBC stream 11a is transferred to second stage solvent extractor 17 in which it is contacted with Au-loaded aqueous stream 13 to form first Au-depleted raffinate 13a and second Au-loaded organic DBC stream 11b. Au-depleted raffinate 13a and second Au-loaded organic DBC stream 11b are collected in second-stage phase separation tank 14 in which second Au-loaded organic DBC stream 11b and first Au-depleted raffinate 13a are separated by gravity. First Au-depleted raffinate 13a is heavier or denser than second Au-loaded organic DBC stream 11b and as such, first Au-depleted raffinate 13a collects at the bottom of second-stage phase separation tank 14 in aqueous phase collection area 14a. Since second Au-loaded organic DBC stream 11b is lighter or less dense than first Au-depleted raffinate 13a, second Au-loaded organic DBC stream 11b collects in organic DBC collection area 14b which is on top of and in contact with first Au-depleted raffinate 13a.

Since the first or fresh charge of DBC solvent 11 to the solvent extraction circuit is contacted first with an aqueous stream already depleted of gold, i.e., first Au-depleted raffinate 13a, the amount of gold recovered from this first extraction stage is small relative to the amount of gold recovered from the second extraction stage, e.g., 1-5 parts per million (ppm) versus 30-45 ppm. However, using a fresh charge of DBC to contact the Au-depleted raffinate allows for a more efficient recovery of the trace amounts of gold in the Au-depleted raffinate as opposed to contacting this stream with an Au-loaded DBC stream. The amount of gold extracted into this fresh DBC charge is not enough to significantly lower its gold-extraction capacity upon contact with fresh gold-bearing filtrate 13. This efficiency, coupled with the head-tail arrangement of the two stages, allows for a solvent extraction circuit footprint to be smaller than a process in which each extraction stage uses a fresh charge of DBC solvent and/or each stage is operated on a batch basis.

Second Au-loaded organic DBC stream 11b is transferred from organic DBC collection area 14b to first acid scrub vessel 18 in which second Au-loaded organic DBC stream 11b is contacted with aqueous acid scrub 19c to form third Au-loaded organic DBC stream 11c (now partially depleted of impurities such as selenium, tellurium, bismuth, antimony and arsenic) and impurities-loaded aqueous acid scrub 19d. Third Au-loaded organic DBC stream 11c and impurities-loaded aqueous acid scrub wash 19d are collected in first-stage, acid scrub phase separation tank 20 in which third Au-loaded organic DBC stream 11c and impurities-loaded aqueous acid scrub 19d are separated by gravity. Impurities-loaded aqueous acid scrub 19d is heavier or denser than third Au-loaded organic DBC stream 11c and as such, impurities-loaded aqueous acid scrub 19d collects at the bottom of phase separation tank 20 in aqueous phase collection area 20b. Since third Au-loaded organic DBC stream 11c is lighter or less dense than impurities-loaded aqueous acid scrub 19d, third Au-loaded organic DBC stream 11c collects in organic DBC collection area 20a which is on top of and in contact with impurities-loaded aqueous acid scrub 19d.

The acid scrub of the Au-loaded organic DBC stream that occurs in first acid scrub vessel 18 and the subsequent phase separation of the aqueous and organic streams that occurs in first-stage, acid scrub phase separation tank 20, i.e., the first stage of the acid scrub circuit, is repeated three times, once each in acid scrub vessels 21, 23 and 25 and acid scrub phase separation tanks 22, 24 and 26, respectively, i.e., the second, third and fourth stages of the acid scrub circuit. In each stage the Au-loaded organic DBC stream (11d, 11e and 11f) is contacted with the impurities-loaded aqueous acid scrub wash (19b, 19a and 19), and in each stage the Au-loaded organic DBC stream is further depleted of impurities and the aqueous acid scrub wash is further loaded with impurities. At the conclusion of the four stage aqueous acid scrub of the Au-loaded DBC organic stream, the impurities content, e.g., all metals other than gold, of the Au-loaded organic DBC stream is reduced typically to less than 40 ppm, more typically to less than 20 ppm and even more typically to less than 5 ppm. The final Au-loaded organic DBC stream, i.e., stream 11f, is removed from organic DBC collection area 26b at the bottom of phase separation tank 26 and transferred to Au-loaded organic DBC collection tank 27 from which it is eventually transferred downstream for gold reduction. The final aqueous acid scrub, i.e., stream 19d, is removed from aqueous phase collection area 20b at the bottom of phase separation tank 20 to aqueous acid scrub collection tank 16. This collected scrub or wash is treated to remove most, if not all, of the impurities that it has collected from the Au-loaded DBC organic stream over the four acid scrub stages, and then transferred upstream for combination with the wet chlorination liquor prior to its introduction into the solvent extraction circuit. The aqueous acid scrub to organic DBC stream volume ratio is typically 1-1.5:1 over the course of the four-stage circuit.

Since the first or fresh charge of aqueous acid scrub (stream 19) is introduced into the acid scrub circuit at the fourth stage of the circuit, its first contact is with Au-loaded DBC organic stream 11e which has already has had its impurities content significantly reduce through three prior countercurrent contacts with the aqueous acid scrub stream. This means that the acid scrub stream most able to extract impurities from the Au-loaded DBC organic stream is employed to remove such impurities from Au-loaded DBC organic stream most difficult from which to remove such impurities, i.e., the Au-loaded DBC organic stream in which the non-gold metals are most dilute. This technique is carried forward such that the Au-loaded DBC organic stream from which it is easiest to extract impurities because their concentration is the greatest is contacted with an acid scrub stream least capable of extracting the impurities because its impurities content is the greatest. The amount of impurities in the acid scrub stream that is used in the first stage of the circuit is not enough to significantly lower its impurities removal capacity. This efficiency, coupled with the head-tail arrangement of the mixing assemblies and phase separation tanks, allows for the acid scrub circuit footprint to be smaller than for an acid scrub circuit in which each scrub stage uses a fresh charge of acid wash and/or each stage is operated on a batch basis.

The combination of the small footprints from the solvent extraction and acid scrub circuits results is a smaller footprint for the overall gold recovery process which, in turn, results in lower capital, operating and maintenance costs to build, operate and maintain the circuits and overall process. As illustrated in FIG. 1, these circuits are arranged such that the mixing assembly is the head of a stage and the phase separation tank is the tail of the stage. The head and tail of each stage of each of the solvent extraction and aqueous acid scrub circuits are in close proximity to one another, and the stages are arranged such that the tail (i.e., phase separation tank) of one stage is in close proximity to the head (i.e., the mixing assembly) of the adjacent stage. Moreover, the phase separation tank of the second stage of the solvent extraction circuit is in close proximity of the mixing assembly of the first stage of the aqueous acid scrub circuit. This arrangement minimizes piping between the components of each stage, the stages of each circuit, and the circuits themselves. Less piping means a smaller overall footprint for each stage and circuit, and this means less capital, operating and maintenance costs. Less piping also facilitates a continuous operation of the individual circuits and the circuits in tandem. This also means less gold held as "inventory" within the process. "In close proximity" means that the components of the stages and circuits, and the circuits relative to one another, are spaced as close to one another so as to minimize piping while maintaining sufficient separation (if any) to allow for ready access for operational and maintenance purposes.

Mixing Assembly

Figure 2:
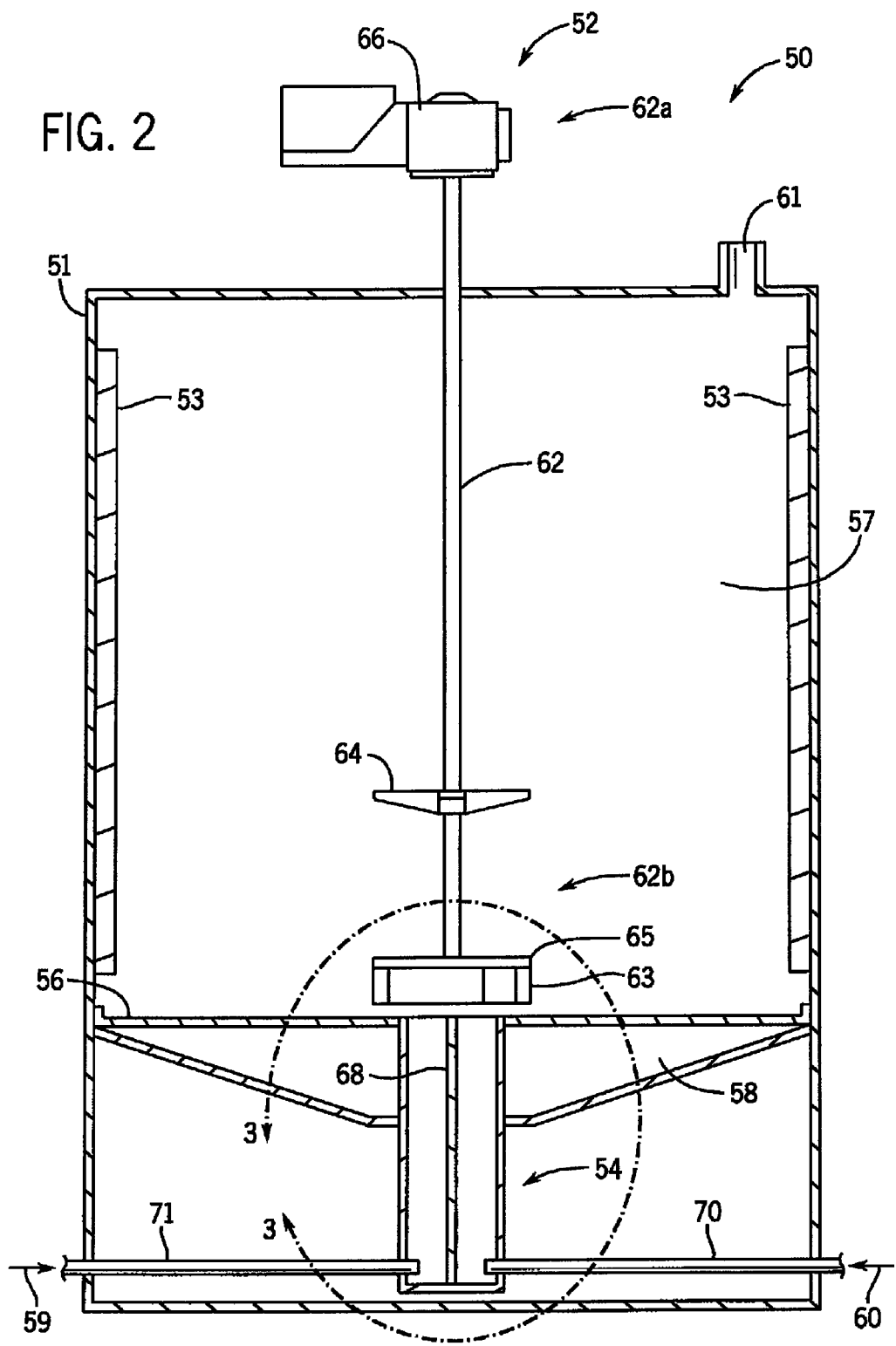
FIG. 2 is a side plane view of one embodiment of a mixing assembly of this invention.

FIG. 2 illustrates one embodiment of the mixing assembly of this invention. Mixing assembly 50 comprises vertical tank 51, mixing device 52 fitted within vertical tank 50, baffle system 53 attached to the side wall of vertical tank 51, and liquid feed assembly 54 connected to and in fluid communication with bottom inlet 55 (shown in FIG. 4) of vertical tank 51. In one embodiment baffle system 53 comprises one or more, preferably two, three or four, longitudinally interior baffles each attached separately to the side wall of the tank and spaced about equally distance from one another. The baffles are flow-directing panels that impede the force or movement of liquids within the tank and assist in stabilizing the liquid flow within the tank, e.g., preventing or minimizing the formation of a vortex of the liquids due to the rotation of the impellers attached to the mixing device shaft. The baffles also assist in preventing or minimizing wobble or other motion of the tank resulting from the operation of the mixing device.

In one embodiment vertical tank 51 is equipped with false bottom 56 which comprises bottom inlet 55 (shown in FIG. 4) and serves as a divider or separator between upper tank volume 57 in which the wet chlorination liquor and DBC organic solvent streams are mixed in the solvent extraction circuit, or the Au-loaded DBC organic stream and acid scrub stream are mixed in the acid scrub circuit, and lower tank volume 58 which is essentially empty other than for liquid feed assembly 54. Liquid feed assembly 54 is connect to and in fluid communication with organic stream feed pipe 71 and aqueous stream feed pipe 70. Vertical tank 51 is also equipped with outlet 61 located at or near the top of the tank and above baffle system 53.

Figure 3:
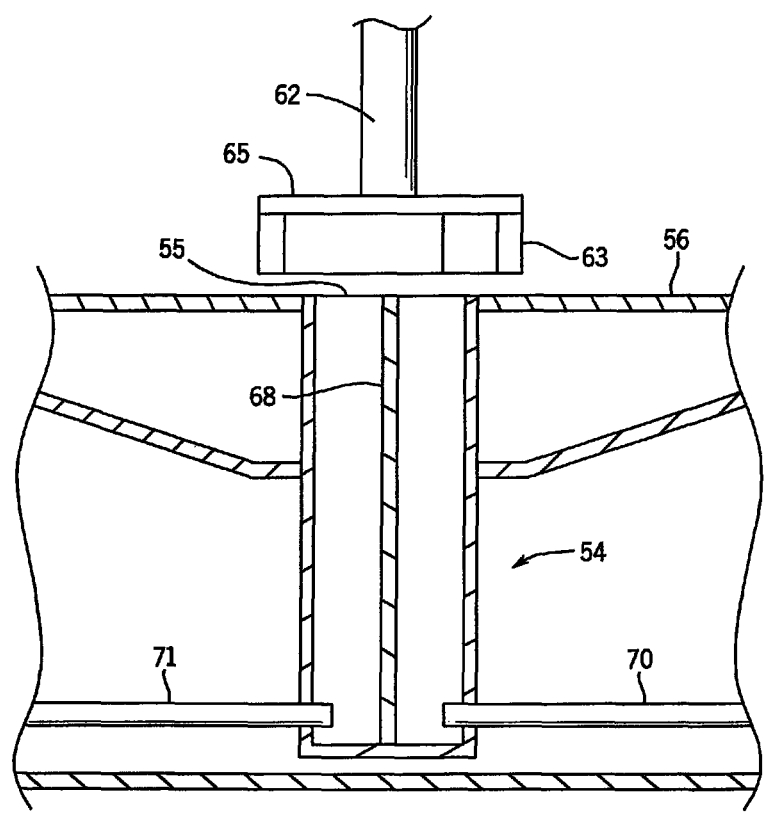
FIG. 3 is a side plane view of one embodiment of a mixing device of this invention.

FIG. 3 illustrates one embodiment of mixing device 52. In this embodiment, mixing device comprises shaft 62 having a top end 62a and a bottom end 62b. Radial impeller 63 is disposed on shaft 62 near or at bottom end 62b, radial flow extension plate 65 is disposed on shaft 62 above radial impeller 63, and axial impeller 64 is disposed on shaft 62 above radial flow extension plate 65. In one embodiment radial flow extension plate 65 is welded or otherwise affixed to radial impeller 63. In one embodiment the diameter of radial flow extension plate 65 is the same or greater than the diameter of radial impeller 63 such that the outer edge of radial flow extension plate 65 is the same distance from shaft 62 as is the outer edge of radial impeller 63 or the outer edge of radial flow extension plate 65 extends beyond the outer edge of radial impeller 63. In one embodiment axial impeller 64 is positioned on shaft 62 at a point above radial flow extension plate 65 and below the midpoint of shaft 62, preferably closer to radial flow extension plate 65 than the midpoint of shaft 62. Variable frequency drive (VFD) motor 66 is attached to or near the top of shaft 62. Mixing device 52 is fitted into and along the central vertical axis of vertical tank 51 such that radial flow impeller 63 is located closest to and above bottom inlet 55 of vertical tank 51, preferably no more than a few inches above bottom inlet 55. The mixing device and several of its variations are further described in U.S. Pat. No. 5,511,881.

The impellers of the mixing device are rotated by the rotation of the shaft which in turn is rotated by the motor. The impellers impart a turbulent motion to the liquid contents of the tank as these contents flow from the bottom of the tank to the top and out of the tank. This mixing motion is not countercurrent inasmuch both the aqueous and organic streams fed to the tank pass from the bottom of the tank to the top of the tank and are brought into intimate contact with one another by the turbulent motion imparted from the rotation of the impellers. The radial flow impeller also serves as a pump in the context that it imparts sufficient force and flow to the liquids to move them from bottom to top and out of the tank. The axial flow impeller primarily serves to impart turbulence, and thus intimate mixing, to the aqueous and organic streams within the tank.

Figure 4:
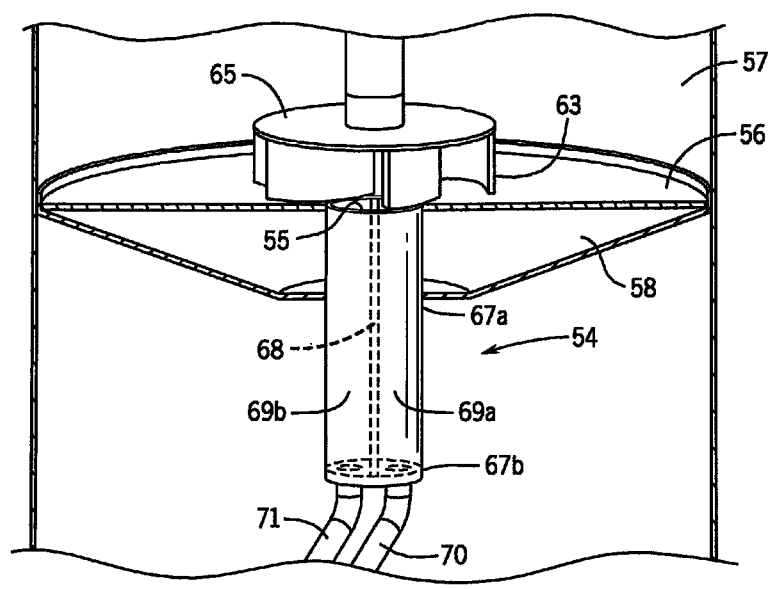
FIG. 4 is a side plane view of one embodiment of a liquid feed assembly of this invention.

FIG. 4 illustrates one embodiment of the liquid feed assembly. In this embodiment, liquid feed assembly 54 comprises liquid feed housing 67 which comprises top end 67a and bottom end 67b. The shape of the housing can vary to convenience, but typically its shape is cylindrical or tubular. Housing 67 is divided into two chambers of generally equal size and configuration. The chambers are formed by divider 68 that runs the length of housing 67 from top end 67a to bottom end 67b. Chamber 69a is separated from chamber 69b by divider 68 such that neither chamber is in fluid communication with the other chamber.

Chamber 69a is in fluid communication with organic stream feed pipe 71 and chamber 69b is in fluid communication with aqueous feed pipe 70. Each chamber is also in fluid communication with volume 57 of vertical tank 51 such that the organic stream from organic stream pipe 71 passes through chamber 69a and into tank 51 and the aqueous stream from aqueous stream pipe 70 passes through chamber 69b and into tank 51. Both the organic and aqueous streams enter tank 51 below radial impeller 63 and do not commingle with one another until they have entered tank 51. This separation of the organic and aqueous streams until they have entered tank 51 allows for better volume control of each stream as compared to configurations in which the streams are allowed to mix with one another, e.g. a configuration in which divider 68 does not run the full length of housing 67 (see, for example, baffle B of FIG. 4 of U.S. Pat. No. 5,511,881). This is particularly important in that at some stages of the solvent extraction and/or aqueous acid scrub circuits the volume ratio of organic to aqueous can be from 1:1 to 8:1 to 20:1 or more, particularly in the solvent extraction circuit and if these streams are allowed to bleed into one another prior to entering tank 51, then maintaining these volume ratios can be very difficult, if not impossible.

Mixing assembly 50 operates in a manner that allows for a fast, thorough mixing of organic and aqueous phases such that in the solvent extraction circuit gold is transferred from the wet chlorination liquor to the DBC organic solvent phase, and in the acid scrub wash circuit impurities are transferred from the Au-loaded DBC organic phase to the acid scrub stream in a quantitative manner. In the solvent extraction circuit, wet chlorination liquor passes from aqueous feed pipe 70, into and through chamber 69a, through inlet 55, and into tank 51. DBC passes from organic feed pipe 71, into and through chamber 69b, through inlet 55, and into tank 51. Once in tank 51, the dual impeller system pumps and mixes the two streams to create an intense turbulence insuring thorough contact of the two streams that in turn allows for a quantitative extraction of gold from the wet chlorination liquor into the DBC. The action of the impellers not only mix the two streams, but also lifts the streams from the bottom of tank 51 to the top of tank 51 such that the blended streams can discharge on a continuous basis through outlet 61 into a phase separation tank. Baffle system 53, e.g., four flat sheets of metal, glass or other like material protruding from the tank sidewall into the tank volume 57 (typically protruding only a few inches into the tank volume 57) insures that a vortex is not formed which would impair a thorough mixing of the streams. The impellers are affixed to the shaft such that the rotation of the shaft the VFD motor necessarily rotates the impellers. This mixing device and tank configuration allows extraction to occur with incoming liquid streams of different physical properties at controlled flow rates optimized for gold extraction.

The operation of the tank and mixing device to remove impurities from an Au-loaded DBC organic stream by contact with an aqueous acid scrub is essentially the same as for the solvent extraction circuit with the understanding that the flow rates of the organic and aqueous streams and the impeller speeds typically differ. Optimization of the solvent extraction and acid scrub circuits is well within the skill of the ordinary artisan.

Phase Separation Tank

Figure 5A:
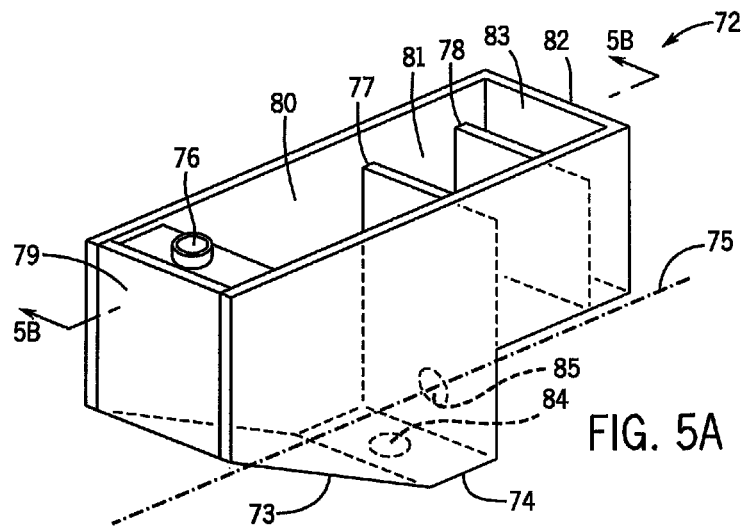
FIG. 5A is a side elevation of one embodiment of a phase separation tank of this invention.
Figure 5B:
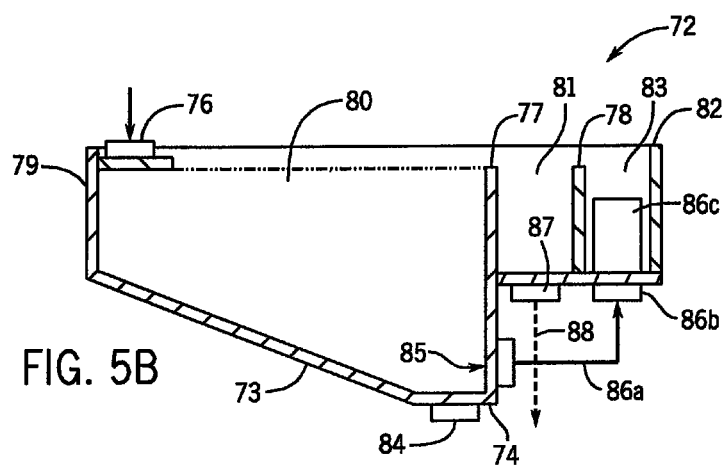
FIG. 5B is a side plane view of the phase separation tank embodiment of FIG. 5A.
Figure 5C:
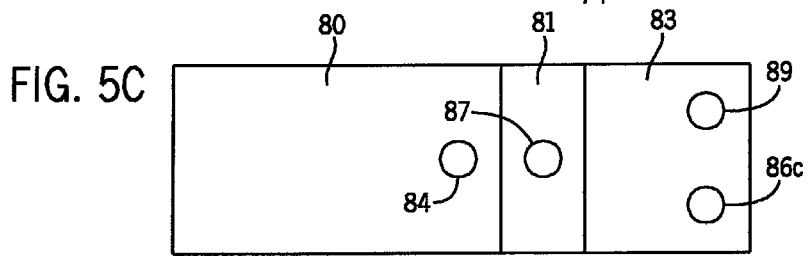
FIG. 5C is a top plan view of the phase separation tank embodiment of FIG. 5A.

FIGS. 5A-C illustrate one embodiment of a phase separation tank of this invention. Phase separation tank 72 can have any general configuration as long as bottom 73 (i.e., the bottom wall beneath phase separation zone or compartment 80) is sloped. Sloped bottom 73 can extend for the length of the separation compartment, or it can flatten out as shown by bottom segment 74. The inclination of the slope is typically 10 to 60 degrees, more typically 10 to 20 degrees and even more typically 10 to 15 degrees, off horizontal plane 75 (here the plane in which the bottom walls of organic liquid compartment 81 and aqueous liquid compartment 83 lie). Tank 72 is equipped with a feed inlet 76, organic separator 77 and aqueous separator 78. Front wall 79 of tank 72 and organic separator 77 form separation zone 80, organic separator 77 and aqueous separator 78 form organic compartment 81, and aqueous separator 78 and back wall 82 of tank 72 form aqueous compartment 83. Drain 84 is located on the bottom wall of separation zone 80, typically on flattened segment 74 but if separation zone 80 is without flattened segment 74, then at the lowest or near lowest point on sloped bottom 73. Of course, the side and bottom walls of tank 72 complete phase separation zone 80, organic compartment 81 and aqueous compartment 83. The bottom wall of tank 72 under the organic and aqueous compartments is typically flat, elevated relative to the lowest point on the sloped bottom wall or flattened segment, and form horizontal plane 75 against which the inclination of sloped wall 73 is measured.

Organic compartment 81 is equipped with outlet 87 which is connected to pipe 88 for discharge of the organic phase from organic compartment 81. Separation zone 80 is equipped with aqueous phase outlet 85 which is in fluid communication with aqueous compartment 83 by pipe 86a, inlet 86b and standpipe 86c. Aqueous compartment 83 is also equipped with standpipe 89 (FIG. 5C) which is in fluid communication with an outlet and a drain pipe (neither shown) for removing excess aqueous phase from aqueous compartment 83.

In operation a mixture of organic and aqueous streams is fed to the phase separation tank from a solvent extraction vessel or an acid scrub wash vessel. The streams enter the phase separation tank through inlet 76 in a blended state. Once inside phase separation zone 80, the streams are allowed to gravity separate due to their density differences with the aqueous stream partitioning toward the bottom of the tank and the organic stream partitioning toward the top of the tank. The phase separation is assisted by the sloped bottom of the tank because the aqueous phase droplets will move down the slope as they contact it and then coalesce with one another as they collect in the bottom of the tank. This phase separation tank design facilitates a faster and/or more complete separation of the organic and aqueous phases than does a tank in which the bottom wall is without a slope, particularly without a slope of at least 10°.

The height of organic separator 77 is lower than the height of the tank sidewalls and as such, the partitioned organic phase overflows from separation zone 80 into organic compartment 81. The separated organic phase is then drained from organic compartment 81 through outlet 87 and pipe 88 for further processing, aqueous acid scrub if from the second phase separation tank of the solvent extraction circuit or gold reduction if from the fourth phase separation tank of the aqueous acid scrub circuit.

The partitioned aqueous phase is removed from separation zone 80 through outlet 85 and transferred to aqueous compartment 83 by pipe 86a, inlet 86b and standpipe 86c. Aqueous compartment 83 is used to maintain the desired liquid level within separation zone 80 and as the liquid level needs to be lowered for whatever reason, partitioned aqueous phase is transferred from separation zone 80 to aqueous compartment 83. If the level of the aqueous phase in aqueous compartment 83 becomes too high, then the level of the aqueous phase is lowered by removing the aqueous phase through standpipe 89 and an outlet and drain pipe not shown. The aqueous phase enters standpipe 89 by overflow, i.e., as the level of the aqueous phase in aqueous compartment 83 rises above the top of standpipe 89, it enters into standpipe 89. The discharged aqueous phase is collected, treated and recycled and/or discharged from the gold recovery process.

It is specifically intended that the present invention not be limited to the embodiments and illustrations contained herein, but include modified forms of those embodiments including portions of the embodiments and combinations of elements of different embodiments as come within the scope of the following claims.

We claim:

1. A phase separation tank for separating an aqueous liquid from an organic liquid, the tank comprising:
    (A) A separation compartment having a sloped bottom wall and an aqueous liquid outlet;
    (B) An organic liquid compartment separated from the separation compartment by an organic separator of a height that allows for the overflow of organic liquid from the separation compartment to the organic compartment;
    (C) An aqueous liquid compartment separated from the organic liquid compartment by an aqueous separator and separated from the separation compartment by the organic compartment, the aqueous liquid compartment in fluid communication with the separation compartment and equipped with an aqueous liquid inlet standpipe and an aqueous liquid outlet standpipe; and
    (D) Means for transferring aqueous liquid from the aqueous liquid outlet of the separation compartment to the aqueous liquid inlet of the aqueous compartment.

2. The phase separation tank of claim 1 in which the inclination of the slope of the bottom wall of the separation compartment is between 10° and 60°.

* * * * *